3,314,997
DINITROHYDRAZINOETHANE
Joseph M. Greendorfer, Santa Clara, Calif., assignor to United Aircraft Corporation, East Hartford, Conn., a corporation of Delaware
No Drawing. Filed Dec. 20, 1963, Ser. No. 332,245
1 Claim. (Cl. 260—583)

The present invention relates to a new composition of matter. More specifically, it is drawn to dinitrohydrazinoethane having the following structural formula:

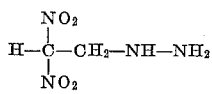

This new composition of matter is useful as a high explosive as well as having other uses that will be apparent to those skilled in the art.

A preferred method for the preparation of dinitrohydrazinoethane requires reacting 2,2 dinitro 1,3 propanediol with hydrazine in the presence of glacial acetic acid. The 2,2 dinitro 1,3 propanediol can be prepared in several manners, one of which is set forth in U.S. Patent No. 3,020,319 by Klager et al. Basically, two parts of hydrazine are reacted with one part of the 2,2 dinitro 1,3 propanediol in the presence of three parts of glacial acetic acid. In order that one may be able to reproduce the results of the present invention, the following examples sets forth one complete method for the synthesis of the newly discovered composition of matter of the present invention.

Example

The quantities of ingredients used are as follows:

| | | |
|---|---|---|
| Hydrazine (95%) | grams | 2.4 |
| Ethyl alcohol | ml | 20.0 |
| Glacial acetic acid | grams | 6.42 |
| Ethyl alcohol | ml | 17.0 |
| 2,2 dinitro 1,3 propanediol | grams | 6.0 |
| Ethyl alcohol | ml | 37.0 |

The 2.4 grams of hydrazine are dissolved in 20 ml. of ethyl alcohol at room temperature and the 6.42 grams of glacial acetic acid are similarly disolved in 17 ml. of ethyl alcohol in a separate container and cautiously added to the first solution. The resulting hydrazine-acetate solution gives a total volume of 37 ml. and has a pH of 5.5 to 6.4.

Six grams of 2,2 dinitro 1,3 propanediol are dissolved in 37 ml. of ethyl alcohol and added dropwise to the hydrazine-acetate solution which is undergoing rapid stirring by means of a magnetic stirring bar. The rate of addition is regulated so that the reaction temperature does not rise above 30° C. After completely mixing the two solutions together, the stirring is continued for 2½ hours to allow the reaction to go to completion at ambient temperature. It is believed that the reaction proceeds according to the following equation:

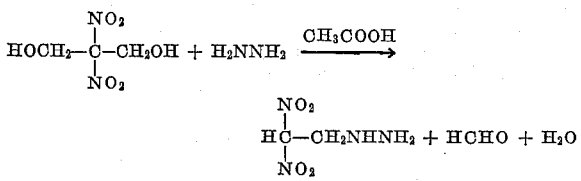

The 1,1-dinitro-2-hydrazinoethane comes out of solution as a yellow precipitate which is then filtered and dried in air. The total yield by holding the reaction temperature to 30° C. is approximately 2.0 grams.

To extract additional 1,1-dinitro-2-hydrazinoethane from the filtrate, this solution can be heated with stirring at approximately 38–47° C. for another 2½ hours and then left to stand overnight to yield an additional 1.5 grams upon filtration and drying, giving a total yield of 64.5%.

A sample of the material was dissolved in a minimum of dimethyl sulfoxide at 50° C. and re-precipitated by adding methyl alcohol, thereby removing trace impurities. The pure recrystallized sample was then used to determine the properties of the material which were found to be as follows:

Structure: $H_2NNH—CH_2—C(NO_2)_2H$
Form: yellow crystals
Molecular weight: 150 (calc.), 157 (exp.)
Melting point: 137–140° C. (decomposed)
Differential thermal analysis (exotherm):
  Onset, 110° C.
  Peak, 115° C. (ignited) (with heating rate of 6° C./min.).
Density: 1.679
Impact sensitivity (Olin-Mathieson Drop Weight Test): 21 kg.cm.
Heat of formation: $-17.5 \pm 2.5$ kcal./mole (exp.)
Analytical data:
  Calc.: C, 16.0; H, 4.0; N, 37.3
  Found: C, 15.94; H, 4.32; N, 38.0
Solubility (sol.):
  Hot water.
  Dimethyl sulfoxide.

In view of the analytical data, it was determined that the structural formula for the yellow crystals is as follows:

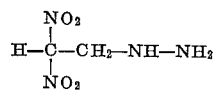

This new composition of matter is highly energetic, making it suitable for use in high explosives and other applications where energetic ingredients are desired.

Although only one method has been described in detail for the preparation of the new composition of matter of the present invention, it is possible that it may be made in a variety of manners. It is to be understood, therefore, that the foregoing detailed description has been given merely by way of illustration and that many variations may be made without departing from the spirit of the invention which is limited only by the following claim. Other uses within the scope of the invention will suggest themselves to those skilled in the art.

I claim:
1,1-dinitro-2-hydrazinoethane.

No references cited.

CHARLES B. PARKER, *Primary Examiner.*
RICHARD L. RAYMOND, *Assistant Examiner.*